United States Patent
Denney et al.

(10) Patent No.: US 11,110,546 B2
(45) Date of Patent: Sep. 7, 2021

(54) LASER HOT WIRE WELDING OF MULTI-LAYERED STRUCTURES

(71) Applicant: Lincoln Global, Inc., Santa Fe Springs, CA (US)

(72) Inventors: Paul E. Denney, Northborough, MA (US); Michael D. Latessa, Chesterland, OH (US); Steven R. Peters, Huntsburg, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 562 days.

(21) Appl. No.: 15/959,857

(22) Filed: Apr. 23, 2018

(65) Prior Publication Data

US 2019/0321914 A1 Oct. 24, 2019

(51) Int. Cl.
*B23K 26/24* (2014.01)
*B23K 26/323* (2014.01)
*B23K 35/40* (2006.01)

(52) U.S. Cl.
CPC ............ *B23K 26/24* (2013.01); *B23K 26/323* (2015.10); *B23K 35/40* (2013.01)

(58) Field of Classification Search
CPC ..... B23K 26/00; B23K 35/0261; B23K 26/21
(Continued)

(56) References Cited

U.S. PATENT DOCUMENTS 8,373,089 B2 * 2/2013 Johnson ............. B23K 35/0261
219/121.64
8,653,417 B2 2/2014 Peters
(Continued)

FOREIGN PATENT DOCUMENTS

CN 106077951 A 11/2016
CN 106 312 304 A 1/2017
(Continued)

OTHER PUBLICATIONS

Extended European Search Report from Corresponding Application No. 19187322.3; dated Nov. 25, 2019; pp. 1-8.
(Continued)

*Primary Examiner* — Tu B Hoang
*Assistant Examiner* — Thomas J Ward
(74) *Attorney, Agent, or Firm* — Knobbe Martens; Brad C. Spencer

(57) ABSTRACT

The disclosed technology generally relates to welding, and more particularly to welding multi-layered structures. In an aspect, a method of welding multi-layered metallic workpieces comprises providing a pair of multi-layered workpieces. Each of the workpieces has a base layer and an cladding layer, where the cladding layer comprises a corrosion resistant element adapted to suppress corrosion in a ferrous alloy. The method additionally comprises forming a root pass weld bead to join cladding layers of the workpieces using a first filler wire comprising the corrosion resistant element and focusing a first laser beam on the cladding layers. The method additionally comprises forming one or more weld beads to join base layers of the workpieces by resistively heating a second filler wire and directing a second laser beam over the root pass weld bead. The method is such that a concentration of the corrosion-resistant element in the one or more weld beads is less than 50% of a concentration of the corrosion-resistant element in the root pass weld bead.

16 Claims, 9 Drawing Sheets

(58) Field of Classification Search
USPC .................. 219/121.63, 124.64, 121.66
See application file for complete search history.

(56) References Cited

U.S. PATENT DOCUMENTS

| | | | |
|---|---|---|---|
| 9,718,147 B2* | 8/2017 | Denney | B23K 26/282 |
| 2011/0042361 A1* | 2/2011 | Nowak | B23P 6/007 |
| | | | 219/121.64 |
| 2012/0298628 A1 | 11/2012 | Bowers | |
| 2013/0146566 A1 | 6/2013 | Peters et al. | |
| 2014/0035279 A1 | 2/2014 | Narayanan et al. | |
| 2014/0124483 A1 | 5/2014 | Henn | |
| 2015/0251275 A1 | 9/2015 | Denney et al. | |
| 2015/0273612 A1 | 10/2015 | Peters et al. | |

FOREIGN PATENT DOCUMENTS

| | | |
|---|---|---|
| CN | 107 457 484 A | 12/2017 |
| JP | S56 30080 A | 3/1981 |
| JP | S60 180667 A | 9/1985 |
| JP | H04344881 A | 12/1992 |
| JP | H07-132389 | 5/1995 |
| JP | H07-314174 | 12/1995 |
| JP | H08-025041 | 1/1996 |
| JP | 2011-050998 A | 3/2011 |
| WO | 2015/132651 A2 | 9/2015 |

OTHER PUBLICATIONS

Extended European Search Report from Corresponding Application No. EP19170587.0; dated Jul. 25, 2019; pp. 1-8.
Avery, "Joining Copper-Nickel Alloys," Copper Development Association Inc., 2017 in 12 pages.
"Hot Wire Laser Welding," Nuclear Services/Installation and Modification Services, Westinghouse Electric Company LLC, 2015 in 2 pages.
Howell, Simon (General Manager Middle East), Kashagan Project: "Selection, Manufacture and Supply of Metallurgically Clad Pipes", Butting; Apr. 2016 in 23 pages.
INCONEL Alloy 625, Special Metals Corporation, Aug. 13, 2013 in 18 pages.
"Laser Hot Wire Cladding," Lincoln Electric Automation Solutions, 2013 in 2 pages.
Smith, "Engineering with CLAD STEEL," Nickel Institute, Engineering with CLAD STEEL, $2^{nd}$ Edition, Oct. 2012 in 24 pages.
Zhou, "Welding of CRA clad materials—three layer (buffer layer) approach", TWI Industrial Member Report Summary 981/2011 in 2 pages.

\* cited by examiner

LASER HOT WIRE WELDING OF MULTI-LAYERED STRUCTURES

BACKGROUND

Field of the Invention

The disclosed technology generally relates to welding, and more particularly to welding multi-layered structures.

Description of the Related Art

Some welded metal components such as tubes and pipes are used in environments or conditions that demand competing technical challenges. For example, some tubes and pipes may be employed in applications where superior mechanical performance as well as superior chemical performance, e.g., high corrosion resistance, are demanded. One such application is offshore oil and gas transport, where welded tubes and pipes are designed to withstand high pressure as well as harsh corrosive environments. However, metal components formed of a uniform material that satisfies one performance parameter may not satisfy other performance parameters. For some applications, metal components formed of multi-layered structures are used to meet the competing technical challenges. However, welding metal workpieces formed of multi-layer structures using traditional arc-based techniques face many challenges, including compromised performance, high cost, availability and/or the need for highly controlled welding procedures. Thus, there is a need for a welding solution to weld metal components formed of multi-layer structures.

SUMMARY

In an aspect, a method of welding multi-layered metallic workpieces comprises providing a pair of multi-layered workpieces. Each of the workpieces has having a base layer formed over a corrosion resistant layer comprising a corrosion resistant element. The method additionally comprises forming a root pass weld bead to join the corrosion resistant layers of the workpieces using a first filler wire comprising the corrosion resistant element. The method additionally comprises forming one or more weld beads to join base layers over the root pass weld bead to join the base layers of the workpieces by resistively heating a second filler wire while directing a laser beam over the root pass weld bead, such that a concentration of the corrosion resistant element in one of the one or more weld beads is less than 50% of a concentration of the corrosion-resistant element in the root pass weld bead.

In another aspect, a method of forming a weld joint comprises providing a pair of multi-layered workpieces each having an base layer and a cladding layer, the cladding layer comprising a corrosion resistant element adapted to suppress corrosion in a ferrous alloy and the base layer comprising the ferrous alloy. The method additionally comprises forming a root pass weld bead to join the cladding layers of the workpieces from a first weld pool using a first filler wire comprising the corrosion resistant element. The method additionally includes forming a buffer weld bead by resistively heating a buffer filler wire while directing a laser beam over the root pass weld bead. The method further comprises forming one or more weld beads on the buffer weld bead to join the base layers of the workpieces using a second filler wire comprising a ferrous alloy.

In yet another aspect, a weldment comprises a pair of welded multi-layered workpieces. The weldment comprises a pair of multi-layered workpieces each comprising a cladding layer comprising a corrosion resistant element adapted to suppress corrosion in a ferrous alloy and an base layer comprising the ferrous alloy. The workpieces are joined serially in a lengthwise direction by a weld joint, where the weld joint comprises a root pass weld bead joining cladding layers of the workpieces comprising the corrosion resistant element and one or more weld beads on the root pass weld bead joining base layers of the workpieces comprising the ferrous alloy. The concentration of the corrosion-resistant element in the one or more weld beads is less than 50% of a concentration of the corrosion-resistant element in the root pass weld bead.

DETAILED DESCRIPTION

Figure 1:
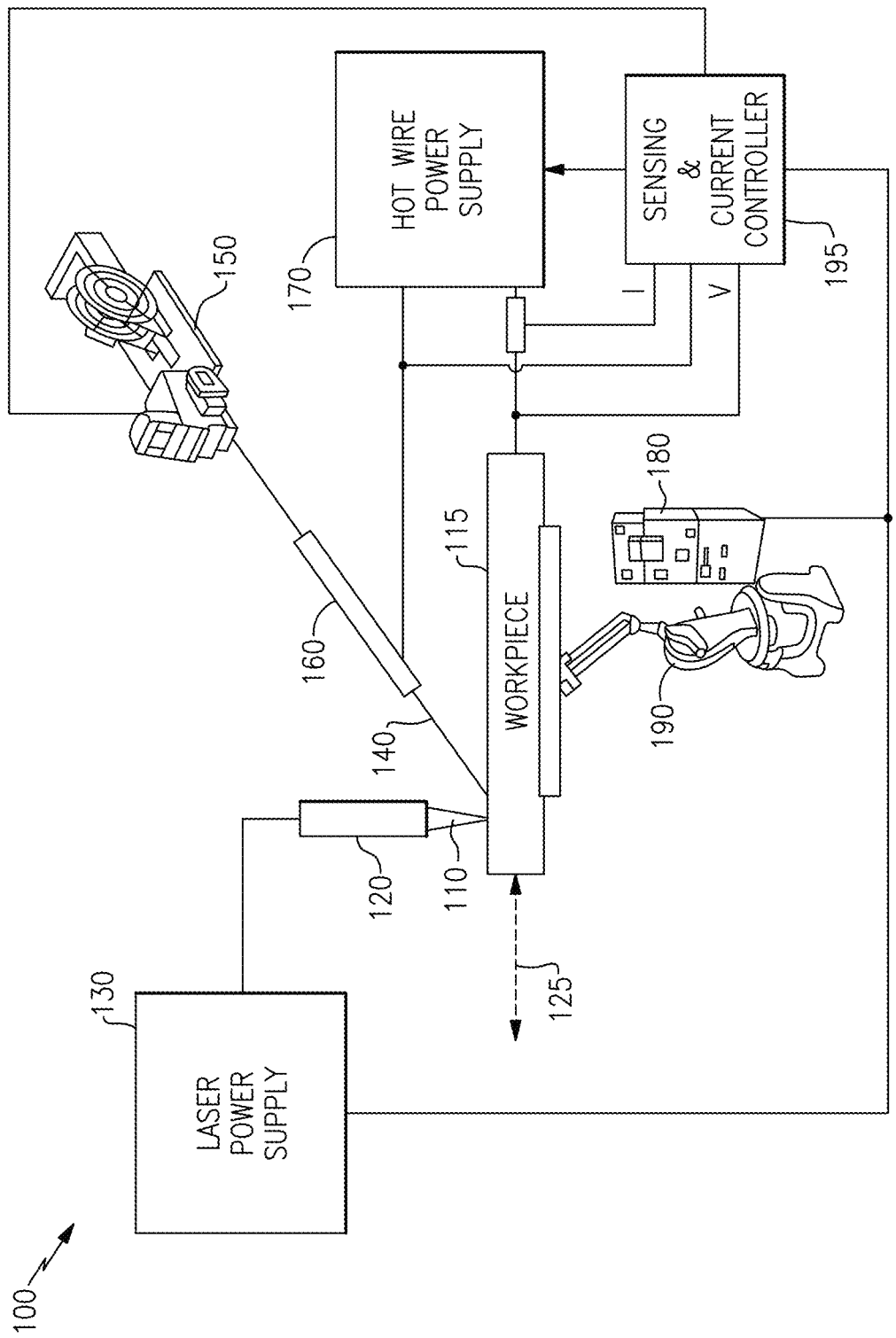
FIG. 1 illustrates a laser hot wire welding system 100 configured for welding multi-layered metallic workpieces, according to some embodiments.

Some metal components such as tubes and pipes are used in environments or conditions that demand competing technical challenges. For example, some tubes and pipes may be employed in environments where superior mechanical performance as well as superior chemical performance, e.g., high corrosion resistance, are demanded. However, an alloy that satisfies one of the performance parameters may not satisfy another one of the performance parameters. Thus, for some applications, competing technical challenges may be met by metal components formed of multi-layered structures.

One such application is offshore oil and gas transport, where welded tubes and pipes are designed to withstand high pressure as well as harsh corrosive environments. The performance demands in the oil and gas industries are becoming increasingly challenging, including higher temperatures, higher pressures, higher corrosion and higher wear, at least in part due to the fact that an increasing percentage of world's remaining oil reserves output crude oil with high levels of corrosive gases containing sulfur, e.g., hydrogen sulfide ($H_2S$), or $CO_2$. As a result, pipes used for transporting such crude oils are demanded to provide higher mechanical, higher thermal, higher tribological and higher corrosion-resistance performances.

To meet these competing needs, some metal components such as tubes and pipes employ multi-layer structures. For example, some cladded tubes and pipes may include, in addition to the main pipe body formed of a ferrous alloy composition or a steel composition such as austenitic and ferritic/martensitic stainless steels or duplex stainless steels to provide the requisite mechanical properties, an inner layer formed of highly corrosion-resistant alloys (CRAs) formed of, for example, complex high nickel chromium alloys, to provide the requisite corrosion resistance. While the ferrous alloy steel composition or the steel composition can include high strength steel, using a nickel alloy filler in conjuction with the high strength steel does not attain the desired strength of the tubes or pipes in many circumstances.

Some metal components such as tubes and pipes employing multi-layer structures can be joined using a variety of techniques including, e.g., gas tungsten arc welding (GTAW), surface tension transfer (STT) or metal deposition techniques using relatively low heat input. The GTAW refers to an arc welding process that produces coalescence of metals by heating them with an arc between a tungsten electrode (non-consumable) and the workpieces. The STT and metal deposition techniques using relatively low heat input refer to a type of gas metal arc welding (GMAW), an arc welding process that produces coalescence of metals by heating them with an arc between a continuous source or filler metal electrode and the workpieces in which shielding is obtained from an externally supplied gas. Unlike standard GMAW, in the STT, current is controlled to adjust the heat independent of wire feed speed, such that changes in electrode extension do not affect heat. Unlike standard GMAW, in some metal deposition techniques using relatively low heat input, a digital process control detects a short circuit and then helps to detach the droplet by retracting the wire. However, welding metal workpieces formed of multi-layer structures using arc-based techniques such as GTAW, STT and some metal deposition techniques using relatively low heat input face many challenges, including high cost, slow speed, availability, compromised performance and/or the need for highly controlled welding procedures. For example, when welding some cladded tubes and pipes having a main pipe body formed of a steel composition and a cladding layer formed of a high nickel-chromium alloy CRA, forming the entire weld joint using a high nickel chromium alloy-based welding wire may be too expensive and/or may result in a weld joint having insufficient yield strength. On the other hand, forming the entire weld joint using a steel composition may result in a weld joint that is inadequately corrosion-resistant. In addition, forming the entire weld joint using a steel composition may result in undesirable dilution, or intermixing of chemical elements between the CRA layer and the steel weld metal layers, which may cause various problems such as, e.g., cracking of the resulting weld joint. Thus, there is a need for a welding solution to weld metal components formed of multi-layer structures.

It will be appreciated that, while various embodiments are described herein in the context of welding, embodiments are not so limited. For example, various embodiments can be applied in the context of additive manufacturing.

FIG. 1 illustrates a laser hot wire welding system 100 configured for welding multi-layered metallic workpieces, according to some embodiments. As described herein, a laser hot wire welding process refers to a welding process in which a laser beam in conjunction with a resistively heated "hot" welding electrode is used to form a weld joint. The system 100 includes a laser subsystem configured to provide energy to a filler wire 140, which may be a consumable wire serving as a source of metal, and/or a workpiece 115, including a laser source 120 powered by a laser power supply 130. The laser source 120 is configured to provide energy to the filler wire 140 and/or the workpiece 115 by focusing a laser beam 110. The laser source 120 is configured to provide the laser beam 110 having sufficient energy density to melt the filler wire 140 and/or the workpiece 115, according to embodiments. The laser team 110 may be, e.g., a continuous wave (CW), modulated or pulsed, and may have a wavelength in the visible spectrum or the near infrared spectrum, in various embodiments.

In various embodiments, the system 100 may be further configured to perform one or more of plasma arc welding, gas tungsten arc welding, gas metal arc welding, flux cored arc welding, and submerged arc welding, in addition to hot wire welding.

The system 100 additionally includes a welding wire feeder subsystem configured to provide, e.g., continuously provide, the filler wire 140 to serve as a source of metal during welding using a wire feeder 150. The welding wire feeder subsystem is configured to direct the welding electrode 140 such that it makes contact with the workpiece 115 in the vicinity of the laser beam 110.

The illustrated wire feeder subsystem further comprises a hot wire power supply 170 configured to provide power to a contact tube 160, which in turn provides current, voltage and/or power for resistively heating the filler wire 140 during operation. In some embodiments, the hot wire welding power supply 170 is a direct current (DC) power supply, e.g., a pulsed DC power supply. However, embodiments are not so limited and in other embodiments, the hot wire power supply 170 can be an alternating current (AC) or other types of power supplies.

In operation, the filler wire 140 is fed from the wire feeder 150 and extends through the contact tube 160 towards the workpiece 115. The extension portion of the filler wire 140 is resistively heated by the current, voltage and/or power delivered by the power supply 170 such that the extension portion can approach, reach or exceed the melting temperature of the filler wire 140 prior to contacting the workpiece 115, e.g., prior to contacting a weld pool on the workpiece 115. As described herein, a weld pool or puddle refers to a localized volume of molten metal prior to its solidification as a weld metal layer or a weld bead. The laser device 120 is configured to provide a laser beam 110 having sufficient power density to at least partially cause the base metal of the workpiece 115 to melt to form the weld pool, and/or to at least partially cause the filler wire 140 to melt to form a molten metal at or above the melting temperature, e.g., a superheated metal onto the workpiece 115.

According to embodiments, the power supply 170 is configured to provide at least a portion, e.g., greater than 50%, greater than 60%, greater than 70%, greater than 80%, greater than 90% or a portion within any of these percentage values, of the energy needed to resistively melt the filler wire 140 and/or to form the weld pool. According to embodiments, the laser device 120 and the laser power supply 130 is configured to provide at least a portion, e.g., greater than 50%, greater than 60%, greater than 70%, greater than 80%, greater than 90% or a portion within any of these percentage values, of the energy needed to resistively melt the filler wire 140 and/or to form the weld pool. The relative amount of energy provided by the laser device 120 can be controlled, e.g., by adjusting the focus of the laser beam 110 using one or more lenses to increase or decrease the intensity thereof. The feeder subsystem may be capable of simultaneously providing one or more wires, in accordance with some other embodiments. For example, a first wire may be used for providing one functionality, e.g., corrosion resistance to the weld joint using, e.g., a high nickel chromium alloy, and a second wire may be used for providing another functionality, e.g., strength or toughness to the weld joint using, e.g., a steel-based alloy.

Still referring to FIG. 1, the system 100 further includes a motion control subsystem capable of moving the laser beam 110 and/or the filler wire 140 to heat a localized portion of the workpiece 115. For example, the motion control subsystem may be configured to move the laser beam 110 in a same direction 125 along the workpiece 115 such that the laser beam 110 and the welding wire 140 remain in a relatively fixed relation to each other, while forming a weld metal along the same direction 125. According to various embodiments, the relative motion between the workpiece 115 and the laser/wire combination may be achieved by either moving the workpiece 115 or by moving the laser device 120 and the hot wire feeder subsystem. In the illustrated embodiment, the motion control subsystem may include a motion controller 180 operatively connected to a robot 190 to control the motion thereof. The robot 190 may in turn be operatively connected (e.g., mechanically secured) to the workpiece 115 to move the workpiece 115 in the direction 125 such that the laser beam 110 and the filler wire 140 effectively travel along the workpiece 115. In accordance with an alternative embodiment, the laser device 110 and the contact tube 160 may be integrated as a single moving part that may be moved along the workpiece 115 via the motion control subsystem operatively connected thereto.

It will be appreciated that there are several methods of moving the laser beam 110 and/or the welding wire 140 relative to the workpiece 115. If the workpiece is round, for example, the laser beam 110 and/or the welding wire 140 may be kept stationary while the workpiece is rotated. On the other hand, if the workpiece is flat, for example, the workpiece 115 may be moved under the laser beam 110 and/or the filler wire 140, as illustrated in FIG. 1. Other configurations are possible. For example, a robot arm or linear tractor or a beam-mounted carriage may be used to move the laser beam 110 and/or the filler wire 140 relative to the workpiece 115.

Still referring to FIG. 1, the system 100 further includes a control subsystem 195 configured to be operatively connected to the workpiece 115 and the contact tube 160 to measure and control various welding parameters during welding. For example, the control subsystem 195 may be capable of measuring a voltage (V) between and/or a current (I) through the workpiece 115 and the hot filler wire 140. The control subsystem 195 may calculate a resistance value (R=V/I) and/or a power value (P=V*I) from the measured voltage and current. Thus obtained various parameters including V, I, R and P may be used to infer various states of the welding process. For example, when the welding wire 140 is in contact with the workpiece 115, the measured voltage between the welding wire 140 and the workpiece 115 may be low, e.g., substantially zero volts, from which the control subsystem 195 may determine that the welding wire 140 is in contact with the workpiece 115, and is therefore operatively connected to the welding wire power supply 170 for controlling the flow of current through the welding wire 140. In accordance with some embodiments, the motion controller 180 may further be operatively connected to the laser power supply 130 and/or the controller 195. The motion controller 180 and the laser power supply 130 may communicate with each other, such that the laser power supply 130 may determine when the workpiece 115 is moving, and that the motion controller 180 may determine when the laser device 120 is active. Similarly, the motion controller 180 and the sensing and current controller 195 may communicate with each other such that the controller 195 may determine when the workpiece 115 is moving, and such that the motion controller 180 may determine when the welding wire feeder subsystem is active. Such communications may be used to coordinate activities between the various subsystems of the system 100.

Figure 2A:
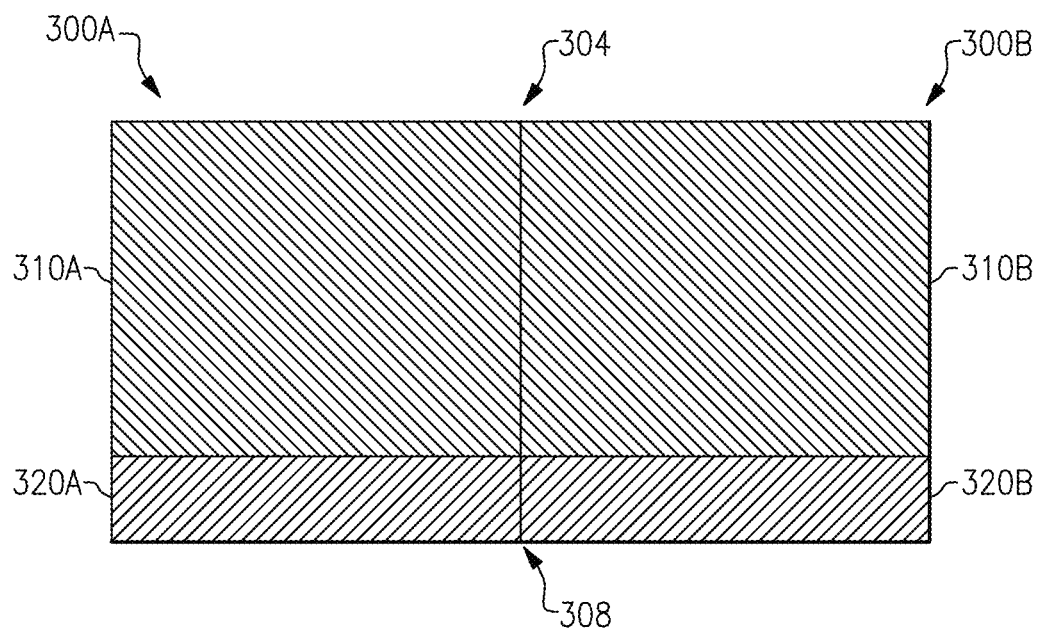
FIGS. 2A-2C illustrate cross-sectional views of intermediate structures at various stages of welding multi-layered metallic workpieces, according to some embodiments.
Figure 2B:
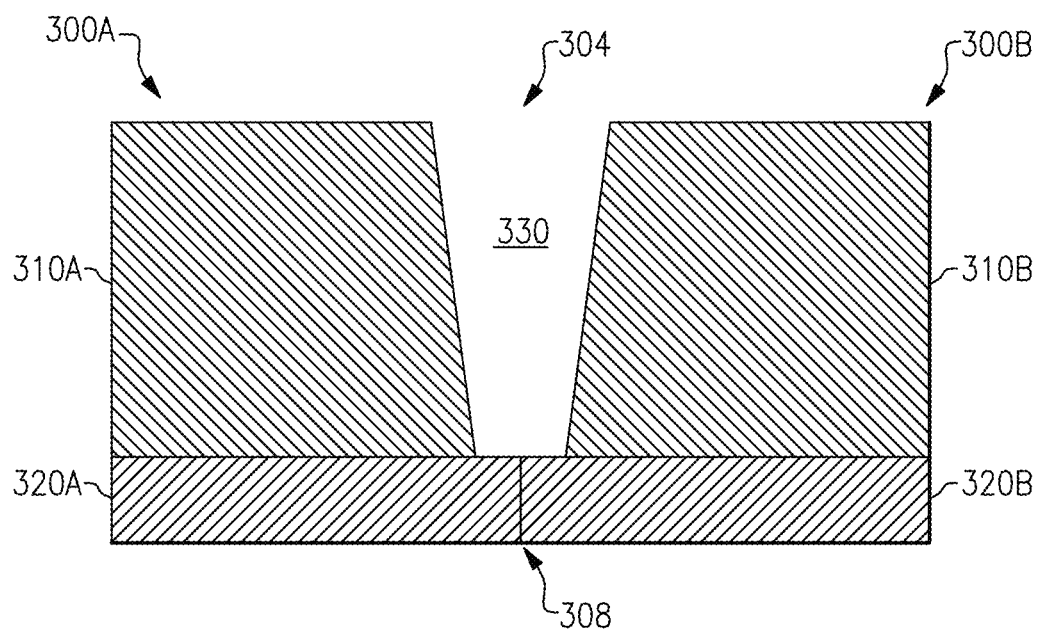
Figure 2C:
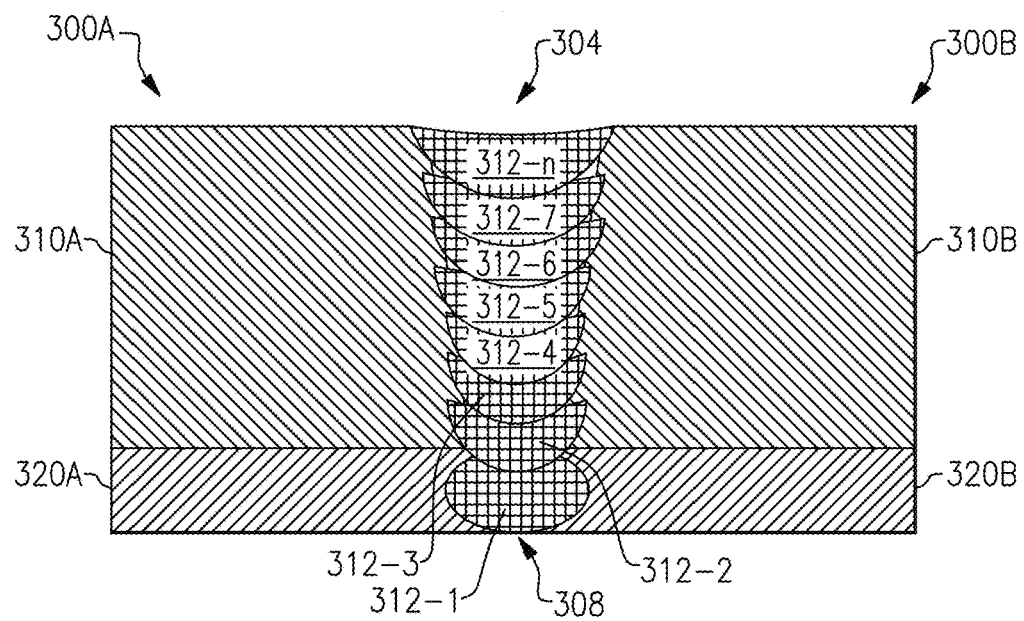

FIGS. 2A-2C illustrate cross-sectional views of intermediate structures at various stages of welding multi-layered metallic workpieces, according to some embodiments. FIG. 2A illustrates an intermediate structure comprising a first multi-layered workpiece 300A and a second multi-layered workpiece 300B to be welded. Each of the first and second workpieces 300A, 300B comprises a multi-layer structure comprising a respective first layer 310A, 310B, e.g., a base layer, and a respective second layer 320A, 320B, e.g., a cladding layer. In some embodiments, the first and second multi-layer structures 300A, 300B can represent cross-sectional views of cladded pipes to be welded. In these embodiments, the first layers 310A, 310B can represent main bodies of cladded pipes to be welded, and the second layers 320A, 320B can represent cladding layers of the cladded pipes. However, embodiments are not so limited and the first and second workpieces 300A, 300B can represent cross-sectional views of multi-layered sheets or any other multi-layered workpieces to be welded. In the illustrated intermediate structure, the first and second multi-layered workpieces 300A and 300B are contacted, prior to commencement of welding, serially in a lengthwise direction such that corresponding first layers 310A, 310B and second layers 320A, 320B of the multi-layered workpieces abut each other at respective first and second joint regions 304, 308 to be welded.

FIG. 2B illustrates an intermediate structure comprising the first multi-layered workpiece 300A and the second multi-layered workpiece 300B, after a groove 330 has been formed in one or both of the first and second joint regions 304, 308. The groove 330 may be formed, e.g., by removing at least portions of the first layers 310A, 310B from edge regions of the multi-layered workpieces 300A, 300B. In the illustrated embodiment, the groove 330 extends completely through the first layers 310A, 310B and is stopped to expose the surfaces of the second layers 320A, 320B at the second joint region 308. However, embodiments are not so limited and in other embodiments, the groove 330 may extend partially through the first layers 310A, 310B and stopped prior to reaching the surfaces of the second layers 320A, 320B within the first joint region 304. In yet other embodiments, the groove 330 may extend past the surfaces of the second layers 320A, 320B and partially into the second layers 320A, 320B and stopped prior to reaching the outer surfaces of the second layers 320A, 320B within the second joint region 308.

It will be appreciated that, while not shown in FIG. 2B for clarity, in various implementations of weld joints used, the root face of the second layers 320A, 320B may be beveled in such a way that a root pass weld bead can keyhole through (sometimes referred to as closed root configuration) or bridge across (sometimes referred to as open root configuration) the root face. Many different bevel designs can be used to suit different applications, as will be appreciated by a skilled artisan, based on particular advantages provided by various root preparations.

FIG. 2C illustrates the first multi-layered workpiece 300A and the second multi-layered workpiece 300B, after a weld joint is formed at the first and second joint regions 304, 308 by a plurality of weld metal layers or weld beads 312-1, 312-2, ..., 312-n. The plurality of weld metal layers or weld beads 312-1, 312-2, ..., 312-n can be formed using a welding wire using a variety of techniques including, e.g., gas tungsten arc welding (GTAW), surface tension transfer (STT) or metal deposition techniques using relatively low heat input. However, as described above, weld joints formed using arc-based techniques may have inadequate mechanical properties and/or expensive. For example, when the workpieces 300A and 300B are steel pipes cladded with corrosion resistant alloys and the weld joint is formed using a steel-based welding wire, the resulting weld joint may have insufficient corrosion resistance and/or insufficient mechanical properties, e.g., low yield strength, due to, e.g., incorporation of corrosion resistant element(s) from the cladding layer into the weld metal layer or beads. On the other hand, forming all of the weld metal layers 312-1, 312-2, ... 312-n using a welding wire having a corrosion resistant alloy may not be cost effective. Thus, according to various embodiments described herein, a weld joint comprising the weld metal layers 312-1, 312-2, ... 312-n is formed using a hot wire laser welding process to control and limit the amount of intermixing of the chemical elements into or between the weld metal layers 312-1, 312-2, ... 312-n. Thus, according to one or more embodiments described herein, one or more of the weld metal layers 312-1, 312-2, ... 312-n is formed using a hot wire laser welding process to control and limit the amount of intermixing of the chemical elements into or between the weld metal layers 312-1, 312-2, ... 312-n. The plurality of weld metal layers or weld beads formed according to embodiments comprises a root pass weld metal layer 312-1 formed at the bottom of the groove and one or more additional weld metal layers 312-2, 312-3, ... 312-n formed on the root pass weld metal layer 312-1, where the compositions of the weld metal layers 312-1, 312-2, ... 312-n are controlled by controlling the electrical power during the resistive heating or melting of one or more filler wires (140 in FIG. 1) and controlling the optical power during focusing a laser beam (110 in FIG. 1) on the filler wire(s) and/or the workpiece.

Figure 2D:
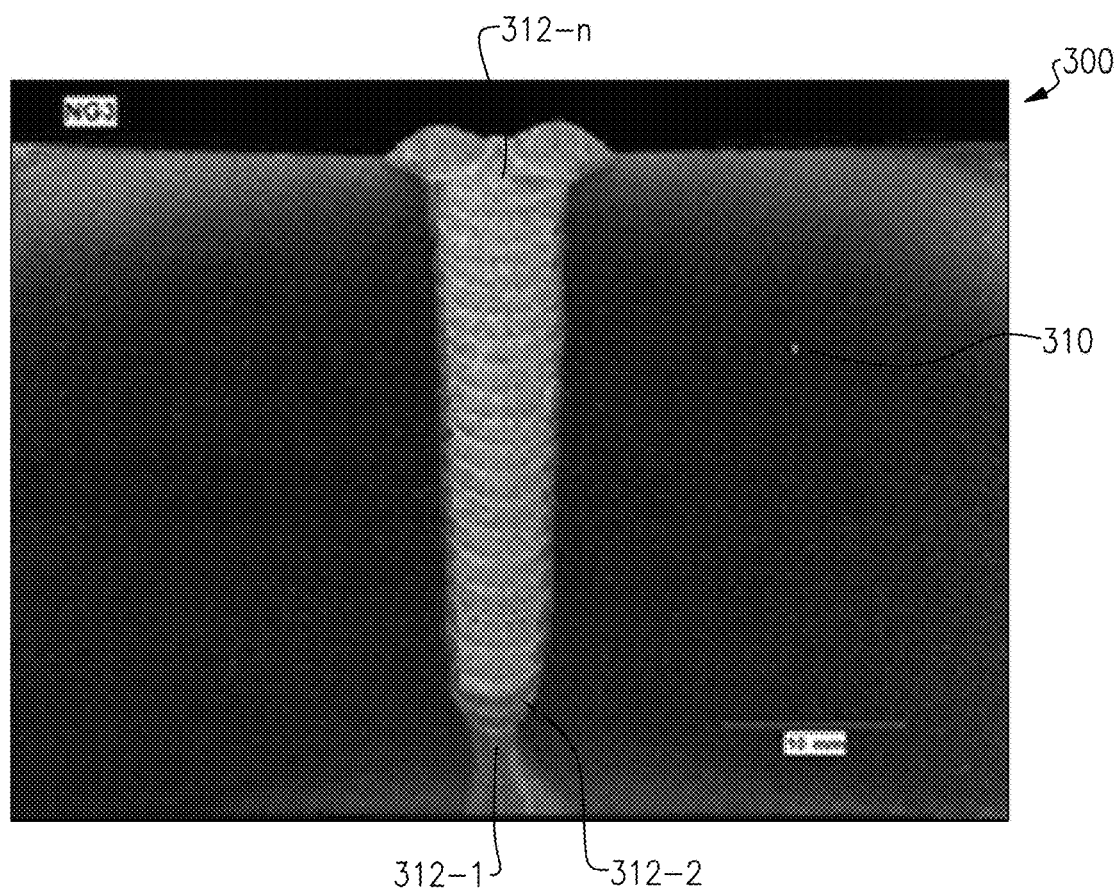
FIG. 2D illustrates a cross-sectional microscope image of an experimental weld joint formed according to a method similar to that described above with respect to FIGS. 2A-2C.

FIG. 2D illustrates a cross-sectional microscope image 300 of an experimental weld joint formed according to a method similar to that described above with respect to FIGS. 2A-2C, except, the cross-sectional image 300 is that of a weld joint formed by joining single layered workpieces formed of a steel composition using a filler wire formed of a similar steel composition. The inventors have discovered that, while hot wire welding to form a weld joint joining single layered workpieces using a single welding wire similar to the illustrated weld joint in FIG. 2D can produce high quality weld joints, for joining multi-layered workpieces, using different welding wires to form different weld metal layers 312-1, 312-2, ... 312-n can be advantageous, for various reasons described herein.

Figure 3:
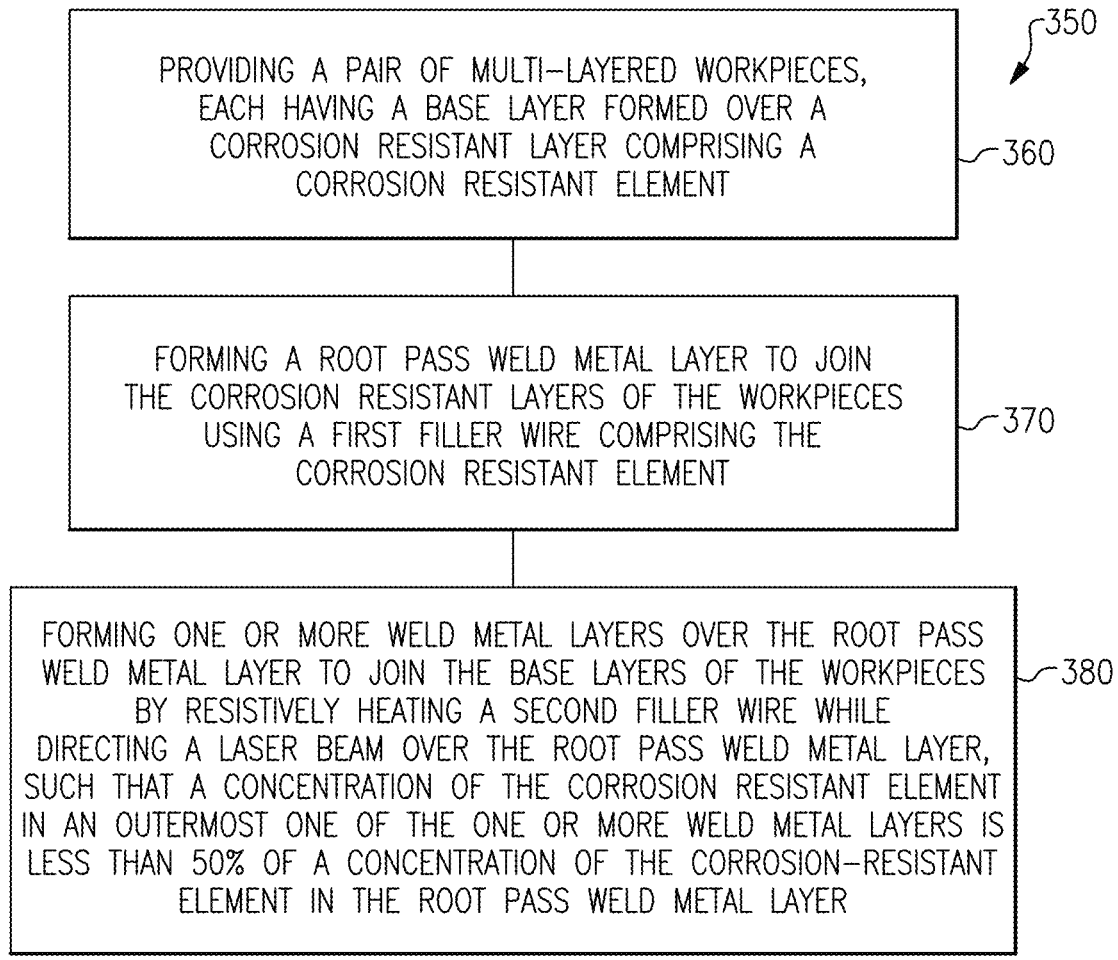
FIG. 3 is a flow chart illustrating a method of welding multi-layered metallic workpieces using a laser hot wire welding system, according to embodiments.

FIG. 3 is a flow chart illustrating a method 350 of welding multi-layered metallic workpieces using more than one welding wire, according to embodiments. The method 350 comprises providing 360 a pair of multi-layered workpieces, similar to first and second workpieces 300A, 300B described above with respect to FIG. 2A. Each of the workpieces has an outer layer and an inner layer, similar to the first layer 310A, 310B and the second layer 320A, 320B described above with respect to FIG. 2A. In the illustrated embodiment, the inner layer comprises a corrosion resistant element. In the illustrated embodiment, providing 360 the pair of multi-layered workpieces includes contacting the first and second workpieces 300A, 300B serially in a lengthwise direction such that corresponding layers of the multi-layered workpieces abut each other at a joint region (e.g., joint regions 304, 308 in FIGS. 2A-2C) to be welded. The method 350 additionally comprises forming a groove at the joint region by removing at least a portion of the outer layer of each of the multi-layered workpieces, in a similar manner as described above with respect to FIG. 2B. Thereafter, the method 350 proceeds to form 370 a root pass weld metal layer to join inner layers of the workpieces by resistively heating a first filler wire comprising the corrosion resistant element while focusing a first laser beam on the inner layers. As described herein, a corrosion resistant element refers to a chemical element which can, when present as part of an alloy composition at a concentration described herein, promote corrosion resistance compared to the alloy composition without the presence of the chemical element at the concentration. For example, corrosion chemical elements can include one or more of Cr, Co, Ni, Mn, Mo, Nb, Ta and Ti, among other elements, depending on the alloy composition.

The root pass weld metal layer (e.g., weld metal layer 312-1 in FIG. 2C) comprises a corrosion resistant element such as Ni and/or Cr, and is formed at a bottom of the groove by resistively heating, e.g., resistively melting. a first filler wire while focusing a first laser beam in the groove, e.g., at the bottom of the groove on the second layers 320A, 320B, to form a weld pool. After forming the root pass weld metal layer, the method 350 proceeds to forming 380 one or more weld metal layers (weld metal layers 312-2, 312-3, ... 312-n), e.g., weld metal layers comprising a steel composition, over the root pass weld metal by resistively heating, e.g., resistively melting, a second filler wire while focusing a second laser beam in the groove, e.g., at the root pass weld metal. The method configures the second filler wire, the second power and the second laser beam are such that chemical elements such as corrosion resistant elements present in the root pass weld metal layer 312-1 and/or in the second layers 320A, 320B incorporates into the subsequent weld metal layer(s) (weld metal layers 312-2, 312-3, ... 312-n) at a concentration less than 50% relative to the root pass weld metal layer 312-1.

Figure 4A:
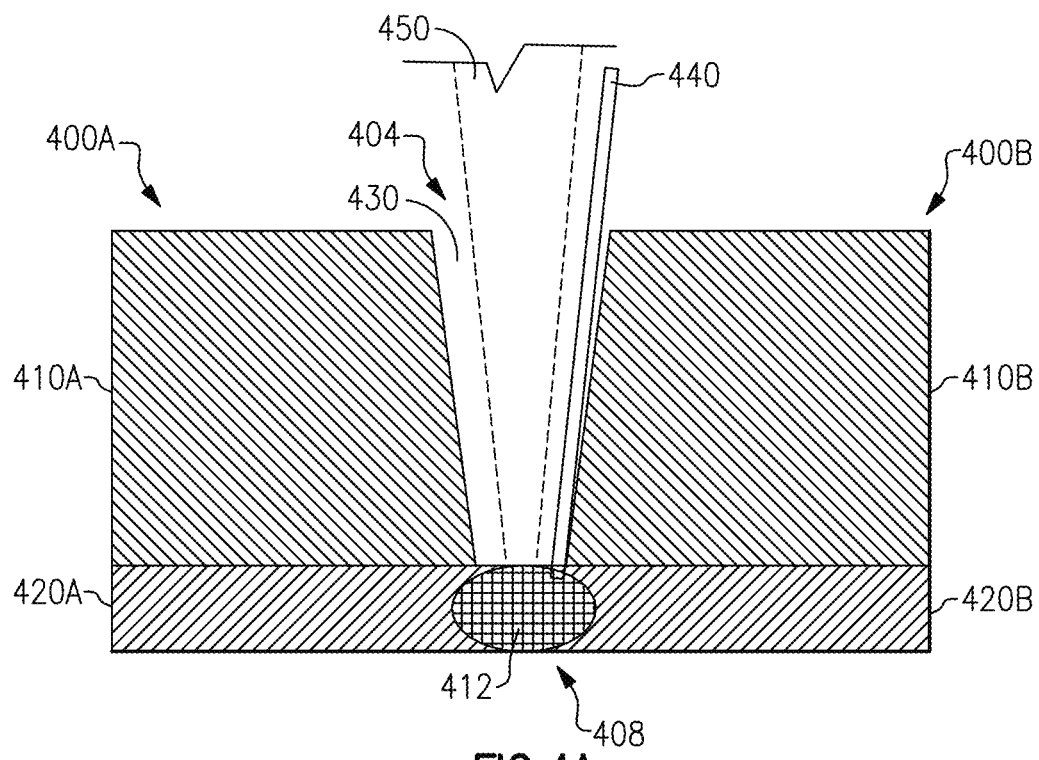
FIGS. 4A-4C illustrate cross-sectional views of intermediate structures at various stages of welding multi-layered metallic workpieces, according to embodiments.
Figure 4B:
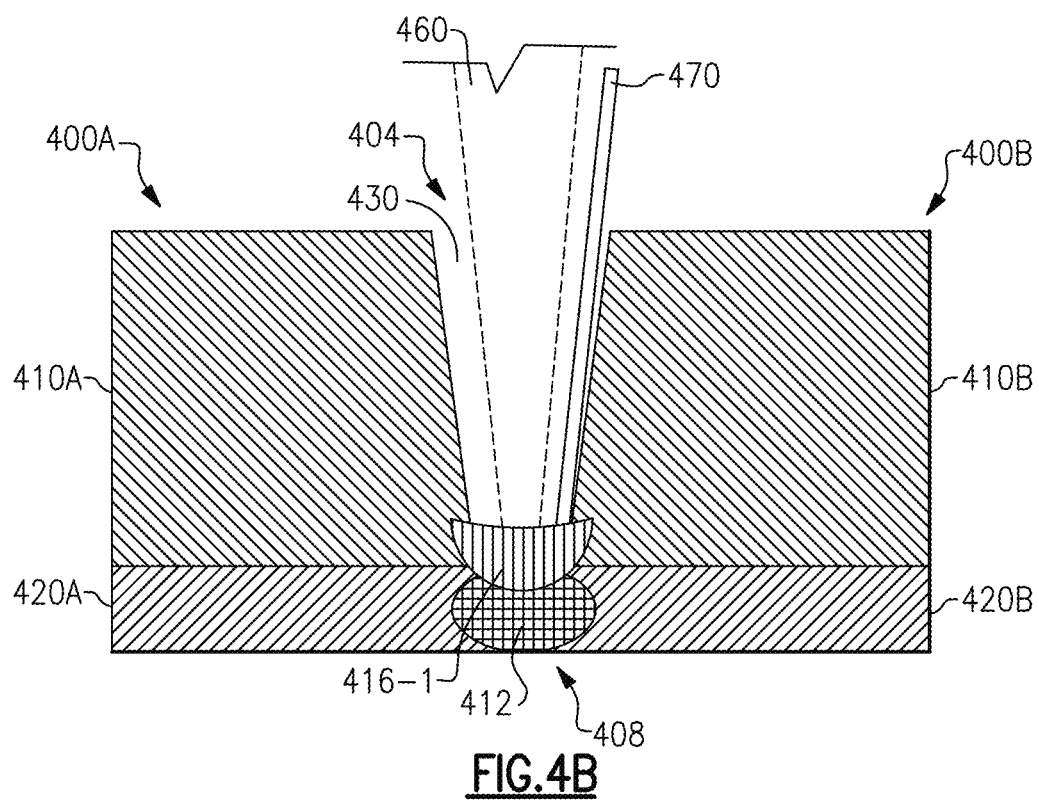
Figure 4C:
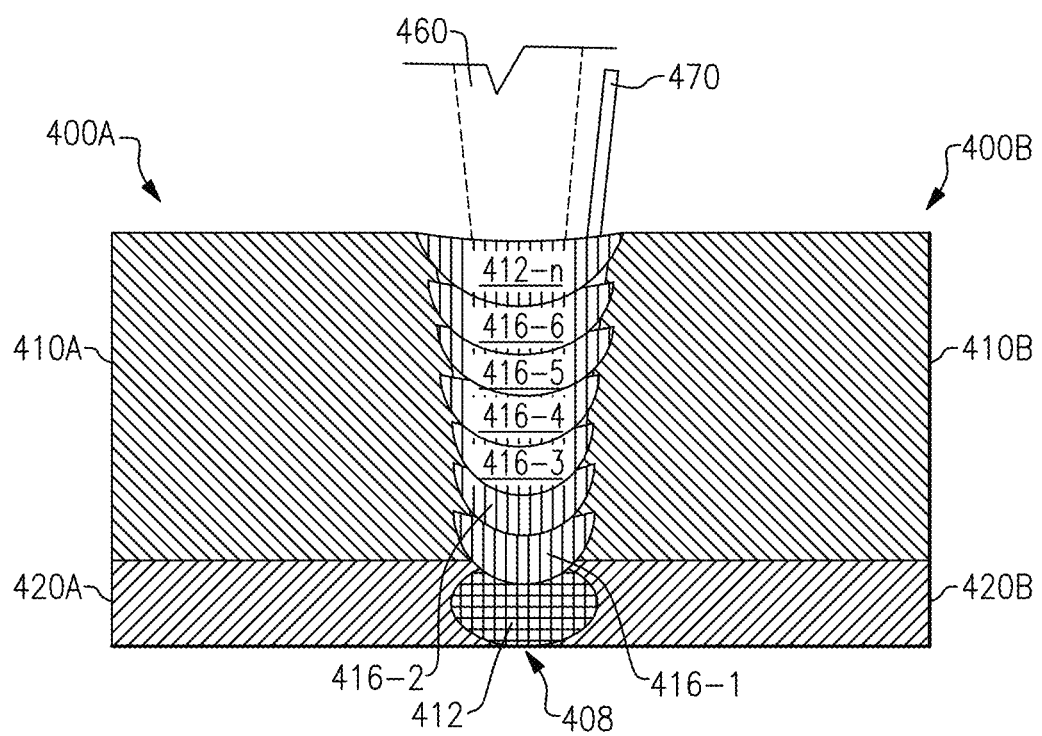

FIGS. 4A-4C illustrate cross-sectional views of intermediate structures at various stages of welding multi-layered metallic workpieces, according to some other embodiments. FIG. 4A illustrates an intermediate structure comprising a first multi-layered workpiece 400A and a second multi-layered workpiece 400B, after a groove 430 has been formed in a similar manner as described above with respect to FIG. 2B, and during or after formation of a root pass weld metal layer 412, comprising a corrosion resistant element at a first concentration, at a bottom of the groove 430 by resistively heating or melting a first filler wire 440 while focusing a first laser beam 450 having a first intensity in the groove, e.g., at the bottom of the groove 430 on the second layers 420A, 420B, to form a root pass weld pool.

In embodiments where the first and second multi-layer structures 400A, 400B represent cross-sectional views of multi-layer walls of cladded pipes, the first layers 410A, 410B can represent main bodies or base layers of cladded pipes. In some embodiments, the first layers 410A, 410B can have a carbon steel composition. Non-limiting examples of carbon steel compositions include Fe and one or more of C at a concentration between about 0.01 wt % and about 0.5 wt %, Si at a concentration between about 0.1 wt % and about 1.5 wt %, Mn at a concentration between about 0.5 wt % and about 5 wt %, S at a concentration between about 0.001 wt % and about 0.05 wt %, P at a concentration between about 0.001 wt % and about 0.05 wt %, Ti at a concentration between about 0.01 wt % and about 0.5 wt %, Zr at a concentration between about 0.01 wt % and about 0.5 wt %, Al at a concentration between about 0.01 wt % and about 0.5 wt % and Cu at a concentration between about 0.1 wt % and about 1 wt %.

In some other embodiments, the first layers 410A, 410B can have a low-carbon steel composition. Some non-limiting examples include compositions having C at a concentration less than about 0.10 wt % and Mn at a concentration up to about 0.4 wt %, and compositions having C at a concentration less than about 0.30 wt % and Mn at a concentration up to about 1.5 wt %.

In some other embodiments, the first layers 410A, 410B can have a low-alloy steel composition. To provide some non-limiting example compositions, a low-alloy steel composition includes Fe and one or more of C at a concentration between about 0.01 wt % and about 0.5 wt %, Si at a concentration between about 0.1 wt % and about 1.0 wt %, Mn at a concentration between about 0.5 wt % and about 5 wt %, S at a concentration between about 0.001 wt % and about 0.05 wt %, P at a concentration between about 0.001 wt % and about 0.05 wt %, Ni at a concentration between about 0.01 wt % and about 5 wt %, Cr at a concentration between about 0.1 wt % and about 0.5 wt %, Mo at a concentration between about 0.1 wt % and about 1 wt %, V at a concentration between about 0.001 wt % and about 0.1 wt %, Ti at a concentration between about 0.01 wt % and about 0.5 wt %, Zr at a concentration between about 0.01 wt % and about 0.5 wt %, Al at a concentration between about 0.01 wt % and about 0.5 wt % and Cu at a concentration between about 0.1 wt % and about 1 wt %.

In some other embodiments, the first layers 410A, 410B can have a stainless steel composition. To provide some non-limiting example compositions, a stainless steel composition typically includes Fe and one or more of C at a concentration between about 0.01 wt % and about 1 wt %, Si at a concentration between about 0.1 wt % and about 5.0 wt %, Cr at a concentration between about 10 wt % and about 30 wt %, Ni at a concentration between about 0.1 wt % and about 40 wt %, Mn at a concentration between about 0.1 wt % and about 10 wt %, S at a concentration between about 0.001 wt % and about 0.05 wt % and P at a concentration between about 0.001 wt % and about 0.05 wt %.

In some embodiments, the second layers 420A, 420B, e.g., cladding layers, can have a corrosion resistant alloy (CRA) composition. In embodiments where the first and second multi-layer structures 400A, 400B represent cross-sectional views of multi-layer walls of cladded pipes, the second layers 420A, 420B can represent cladding layers of cladded pipes. For example, in some embodiments, the second layers 420A, 420B include a combination of corrosion-resistant elements including one or more of: Ni at a concentration greater than about 40%, greater than about 45 wt %, greater than about 50 wt %, greater than about 55 wt %, greater than about 60 wt %, greater than about 65 wt %, greater than about 70 wt %, greater than about 75 wt %, greater than about 80 wt % or a concentration in a range defined by any of these values; Cr at a concentration between about 1 wt % and about 40 wt %, between about 5 wt % and about 35 wt %, between about 10 wt % and about 30 wt %, between about 15 wt % and about 25 wt %, between about 20 wt % and about 23 wt %, or a concentration in a range defined by any of these values; Fe at a concentration less than 10 wt %, less than 8 wt %, less than 6 wt %, less than 2 wt % or a concentration in a range defined by any of these values; Mo at a concentration between about 1 wt % and about 25 wt %, between about 2 wt % and about 20 wt %, between about 4 wt % and about 15 wt %, between about 6 wt % and about 12 wt %, between about 8 wt % and about 10 wt %, or a concentration in a range defined by any of these values; Nb and/or Ta at a concentration between about 1.0 wt % and about 6.5 wt %, between about 1.5 wt % and about 6.0 wt %, between about 2.0 wt % and about 5.5 wt %, between about 2.5 wt % and about 5.0 wt %, between about 3.0 wt % and about 4.5 wt %, or a concentration in a range defined by any of these values; and one or more of C, Mn, Si, P, S, Al, Ti and Co at a concentration less than 1 wt %, less than 0.8 wt %, less than 0.6 wt %, less than 0.4 wt %, less than 0.2 wt %, less than 0.1 wt %, less than 0.05 wt %, or a concentration in a range defied by any of these values.

In some other embodiments, the second layers 420A, 420B can have a stainless steel composition. To provide some non-limiting example compositions, a stainless steel composition typically includes Fe and one or more of C at a concentration between about 0.01 wt % and about 1 wt %, Si at a concentration between about 0.1 wt % and about 5.0 wt %, Cr at a concentration between about 10 wt % and about 30 wt %, Ni at a concentration between about 0.1 wt % and about 40 wt %, Mn at a concentration between about 0.1 wt % and about 10 wt %, S at a concentration between about 0.001 wt % and about 0.05 wt % and P at a concentration between about 0.001 wt % and about 0.05 wt %.

In various embodiments, the first layers 410A, 410B can have thicknesses greater than about 10 mm, greater than about 20 mm, greater than about 30 mm, greater than about 40 mm, greater than about 50 mm, greater than about 60 mm, or a thickness in a range defined by any of these values.

In various embodiments, the second layers 420A, 420B can have thicknesses less than about 15 mm, less than about 10 mm, less than about 5 mm, less than about 4 mm, less than about 3 mm, less than about 2 mm, or a thickness in a range defined by any of these values.

In embodiments where the first multi-layered workpiece 400A and the second multi-layered workpiece 400B represent cladded pipes or tubes, their outer diameters can be within or outside a range of 2" to 48".

Still referring to FIG. 4A, in the illustrated stage of welding, the root pass weld metal layer 412 having a corrosion resistant element, e.g., Cr and/or Ni, at a first concentration is formed in the groove, e.g., at a bottom of the groove 430 by resistively heating a first filler wire 440 while focusing a first laser beam 450 having a first intensity in the groove, e.g., at the bottom of the groove 430 or on the second layers 420A, 420B, to form a weld pool.

In the illustrated embodiment, the first filler wire 440 can have a corrosion resistant alloy composition similar to those described above with respect to the second layers 420A, 420B. In different embodiments, the first filler wire 440 can have a corrosion resistant alloy composition that is substantially different from that of the second layers 420A, 420B.

The root pass weld pool from which the root pass metal layer 412 is formed may be formed from one or more of molten first filler wire 440 and molten second layers 420A, 420B. In some embodiments, the first laser beam 450 at the first laser power is sufficient to form at least a portion of the weld pool. That is, the first laser beam 450 may be sufficient to melt at least the surface of the second layers 420A, 420B, and/or to melt at least the tip portion of the first filler wire 440. In some other embodiments, the resistive heating of the first filler wire 440 at the first resistive heating power may be sufficient to form at least a portion of the weld pool. That is, the resistive heating of the first filler wire 440 may be sufficient to melt at least the tip region thereof and/or at least the surface of the second layers 420A, 420B. Under some circumstances, the resistive heating of the at least the tip region of the first filler wire 440 may provide sufficient heat to form a superheated liquid at a temperature higher than a melting temperature of the first filler wire 440, which may in turn melt at least a surface region of the second layers 420A, 420B upon being deposited thereon. In some other embodiments, a combination of the first laser beam 450 and the resistive heating of the first filler wire 440 provide sufficient energy to form the weld pool based on any of the above mechanisms.

In various embodiments, the first laser beam 450 is focused at the bottom of the groove 430 to have a first laser power density or a first laser intensity, such that at least surface portions of the second layers 420A, 420B at the second joint region 408 are melted to form a weld pool extending at least partially into the thicknesses of the second layers 420A, 420B at the second joint region 408. For example, the first laser intensity, which depends on a variety of factors such as the waveform (e.g., continuous wave versus pulsed), the wavelength and the spot size, may be sufficient to at least partially cause at least surface portions of the second layers 420A, 420B to reach a temperature near or exceeding a melting temperature of the second layers 420A, 420B. For example, the first laser intensity may at least partially cause at least surface portions of the second layers 420A 420B to reach a temperature exceeding 1000° C., exceeding 1100° C., exceeding 1200° C., exceeding 1300° C., exceeding 1400° C., exceeding 1500° C., exceeding 1600° C., or a temperature in a range defined by any of these values.

In some embodiments, the first intensity of the first laser beam 450 is sufficient to at least partially cause the weld pool and the resulting root pass weld metal layer 412 to penetrate an entire thickness of the second layers 420A, 420B. In some other embodiments, the first intensity of the first laser beam 450 is such that the weld pool and the resulting root pass weld metal layer 412 penetrates less than an entire thickness of the second layers 420A, 420B.

In various embodiments, the first filler wire 440 is resistively heated at a first resistive heating power to at least partially cause at least the tip region of the first filler wire 440 contacting the weld pool or a bottom surface of the groove 430 to reach a temperature near or exceeding a melting temperature of the first filler wire 440. For example, the first resistive heating power, which depends on a variety of factors such as the resistance of the first welding electrode 440 and the contact resistance between the first welding electrode 440 and the weld pool or a bottom surface of the groove, may be sufficient to at least partially cause the tip region of the first filler wire 440 to reach a temperature exceeding 1000° C., exceeding 1100° C., exceeding 1200° C., exceeding 1300° C., exceeding 1400° C., exceeding 1500° C., exceeding 1600° C., or a temperature in a range defined by any of these values.

Thus formed root pass weld metal layer 412 has a composition formed of a mixture of the first weld wire 440 and the second layers 420A, 420B and may have a composition similar to those of the second layers 420A, 420B and the first filler wire 440.

FIG. 4B illustrates an intermediate structure comprising a first multi-layered workpiece 400A and a second multi-layered workpiece 400B, during or after formation of a first one 416-1 of one or more weld metal layers 416-1, 416-2, . . . 416-n in the groove 430, on the root pass weld metal layer 412, by resistively heating or melting a second filler wire 470 different from the first electrode 440 while focusing a second laser beam 460 having a second intensity different than the first intensity of the first laser beam 450 in the groove 430, e.g., at the root pass weld metal 412. Various parameters including the root pass weld metal layer 412, first and second filler wires 440, 470, the first layers 410A, 410B, the second laser beam 460, the second intensity of the second layer beam 460 and the second power for resistively melting the second filler wire 470 are such that one or more weld metal layers 416-1, 416-2, . . . 416-n incorporates the corrosion resistant element at a concentration less than 50% of the first concentration of the corrosion resistant element in the root pass weld metal layer 412.

The first weld pool from which the first weld metal layer 416-1 is formed may be formed of one or more of molten root pass weld metal layer 412, molten second filler wire 470 and molten first layers 410A, 410B. In some embodiments, the second laser beam 460 at the second laser power is sufficient to form at least a portion of the weld pool. That is, the second laser beam 460 may be sufficient to melt at least the surface of the root pass weld metal layer 416-1, the first layers 420A, 420B, and/or to melt at least the tip portion of the second filler wire 470. In some other embodiments, the resistive heating of the second filler wire 470 at the second resistive heating power may be sufficient to form at least a portion of the weld pool. That is, the resistive heating of the second filler wire 470 may be sufficient to melt at least the tip region thereof and/or at least the surface of the root pass weld metal layer 412 and/or of the first layers 410A, 410B. Under some circumstances, the resistive heating of the at least the tip region of the second filler wire 470 may provide sufficient heat to form a superheated liquid at a temperature higher than a melting temperature, which may in turn melt at least a surface region of the root pass weld metal layer 412 and/or the first layers 410A, 410B upon being deposited thereon. In some other embodiments, a combination of the second laser beam 460 and the resistive heating of the second filler wire 470 provide sufficient energy to form the weld pool based on any of the above mechanisms.

According to embodiments, the second filler wire 470 has a composition that is different than the first filler wire 440. For example, the second filler wire 470 can have one of steel compositions similar to those described above with respect to the first layers 410A, 410B. In different embodiments, the second filler wire 470 can have a steel composition that is substantially different from that of the first layers 410A, 410B described above.

According to embodiments, the second laser beam 460 has a second laser power density that is lower than the first laser power density of the first laser beam 450 described above, such that the amount of melting of the root pass weld metal layer 412, the first layers 410A, 410B and/or the second filler wire 470 is less than the amount of melting of the second layers 420A, 420B and the first filler wire 440 by the first laser power of the first laser beam 450 during formation of the root pass weld metal layer 412. In various embodiments, a ratio of the power density of the second laser beam 460 to the power density of the first laser beam 450 may be less than 0.5, less than 0.2, less than 0.1, less than 0.05, less than 0.02, less than 0.01 or a ratio in a range defined by any of these values. The ratio of the power densities may at least partially result from a ratio of energy densities, e.g., where the first and second laser beams 450, 460 are CW laser beams. In these embodiments, a ratio of the energy density of the second laser beam 460 to the energy density of the first laser beam 450 may be less than 0.5, less than 0.2, less than 0.1, or a ratio in a range defined by any of these values. However, embodiments are not so limited and the ratio of power densities may at least partially result from a ratio of pulse durations, e.g., where the first and second laser beams 450, 460 are pulsed laser beams.

According to embodiments, the second resistive heating power for resistively heating the second welding wire 470 is lower than the first resistive heating power for resistively heating the first welding electrode 440, such that the amount of melting of the root pass weld metal layer 412, the first layers 410A, 410B and/or the second filler wire 470 is less than the amount of melting of the second layers 420A, 420B and the first filler wire 440 by the first resistive heating power of the first welding electrode 440. In various embodiments, a ratio of the second resistive heating power for resistively heating the second welding wire 470 to the first resistive heating power for resistively heating the first welding wire 440 may be less than 0.5, less than 0.2, less than 0.1, or a ratio in a range defined by any of these values. The ratio of the power densities may result from a ratio of energy densities, e.g., where the first and second currents used to heat the first and second welding wires 440, 470 are DC currents. In these embodiments, a ratio of the energy density of the second restive heating power to the first resistive heating power may be less than 0.5, less than 0.2, less than 0.1, or a ratio in a range defined by any of these values. However, embodiments are not so limited and the ratio of power densities may result from a ratio of pulse durations, e.g., where the first and second resistive heating powers result from pulsed voltage or currents.

The second laser intensity, which depends on a variety of factors such as the waveform (e.g., continuous wave versus pulsed), the wavelength and the spot size, may be sufficient to at least partially cause at least surface portions of the root pass metal layer 412 and/or the first layers 410A, 410B to reach a temperature near or exceeding a melting temperature of the first layers 410A, 410B. For example, the second laser intensity may at least partially cause at least surface portions of the second layers 420A 420B to reach a temperature exceeding 800° C., exceeding 900° C., exceeding 1000° C., exceeding 1100° C., exceeding 1200° C., exceeding 1300° C., exceeding 1400° C., exceeding 1500° C., or a temperature in a range defined by any of these values.

In some embodiments, the first intensity of the first laser beam 450 is sufficient to at least partially cause the weld pool and the resulting root pass weld metal layer 412 to penetrate an entire thickness of the second layers 420A, 420B. In some other embodiments, the first intensity of the first laser beam 450 is such that the weld pool and the resulting root pass weld metal layer 412 penetrates less than an entire thickness of the second layers 420A, 420B.

In various embodiments, the second filler wire 470 is resistively heated at a second resistive heating power to at least partially cause at least the tip region of the second filler wire 470 contacting the root pass weld metal layer 412 or a bottom surface of the groove 430 to reach a temperature near or exceeding a melting temperature of the second filler wire 470. For example, the second resistive heating power, which depends on a variety of factors such as the resistance of the welding electrode 440 and the contact resistance between the second welding electrode 470 and the weld pool or a bottom surface of the groove, may be sufficient to at least partially cause the tip region of the second filler wire 470 to reach a temperature exceeding 800° C., exceeding 900° C., exceeding 1000° C., exceeding 1100° C., exceeding 1200° C., exceeding 1300° C., exceeding 1400° C., exceeding 1500° C., or a temperature in a range defined by any of these values.

According to embodiments, the first laser power of the first laser beam 450, the second laser power of the second laser beam 460, the first resistive heating power of the first filler wire 440 and the second resistive heating power of the second filler wire 470 are such that the temperature of the first weld pool from which the first weld metal layer 416-1 is formed may be lower than the temperature of the root pass weld pool from which the root pass weld metal layer 412 is formed by a temperature difference exceeding 100° C., exceeding 200° C., exceeding 300° C., exceeding 400° C., exceeding 500° C., or a temperature difference in a range defined by any of these temperatures.

Thus formed first weld metal layer 416-1 has a composition formed of a mixture of the second weld wire 470, the first layers 410A, 410B, and/or the root pass weld metal layer 412, and may have a composition similar to those of the second weld wire 470 and/or the first layers 410A, 410B. Advantageously, according to the methods described herein, incorporation of chemical elements of the root pass weld metal layer 412 into the first weld metal layer 416-1 is controlled or limited by, among other things, the lower temperature reached by the first weld pool compared to the temperature reached the root pass weld pool. Advantageously, in various embodiments, the first weld metal layer 416-1 incorporates various chemical elements, e.g., corrosion resistant elements, of the root pass weld layer 412 described above at a concentration less than 50 wt %, less than 40 wt %, less than 30 wt %, less than 20 wt %, less than 10 wt %, less than 5 wt %, less than 1 wt %, or a concentration in a range defined by any of these values relative to the concentrations of the various chemical elements in the root pass weld metal layer 412. In various embodiments, the first weld metal layer 416-1 incorporates corrosion resistance elements, e.g., Cr, Ni, Mo, Nb or Ta, individually or in combination, present in the root pass weld metal layer 412 at a concentration less than 20 wt %, less than 15 wt %, less than 10 wt %, less than 5 wt %, less than 2 wt %, less than 1 wt %, or at a concentration in a range defined by any of these values. Among other advantages, controlling or limiting the incorporation of the chemical elements of the root pass weld metal layer 412 into the first weld metal layer 416-1 prevents degradation of certain properties of the resulting joint, including cracking.

FIG. 4C illustrates an intermediate structure comprising a first multi-layered workpiece 400A and a second multi-layered workpiece 400B, during or after formation of additional ones 416-2, 416-3, . . . 416-n of the one or more weld metal layers 416-1, 416-2, . . . 416-n in the groove 430, on the first weld metal layer 416-1. According to some embodiments, the additional ones 416-2, 416-3, . . . 416-n of one or more weld metal layers 416-1, 416-2, . . . 416-n can be formed in a manner similar to the first weld metal layer 416-1 described above, by further resistively melting the second filler wire 470 at a similar resistive heating power while focusing the second laser beam 460 at a similar laser intensity. However, embodiments are not so limited, and in other embodiments, the additional ones 416-2, 416-3, . . . 416-n of the one or more weld metal layers 416-1, 416-2, . . . 416-n can be formed using a different filler wire, different resistive heating power and/or different laser power. In yet some other embodiments, the additional ones 416-2, 416-3, . . . 416-n of the one or more weld metal layers 416-1, 416-2, . . . 416-n can be formed using other welding techniques, such as gas metal arc welding (GMAW).

According to various embodiments, the intense heat of the second laser beam 460 is sufficient to create a weld pool out of the second filler wire 460, while heat is carried away from the resulting weld pool by the surrounding material at a sufficiently fast rate such that penetration of the underlying weld bead is greatly reduced or prevented. It will be appreciated that laser is particularly suited for this effect. Thus, according the embodiment described above with respect to FIGS. 4A-4C, by controlling the resistive heating power during resistively heating the second filler wire 470 and the laser power density, incorporation of certain chemical elements, e.g., corrosion resistant elements, of the root pass weld metal layer 412 into the one or more weld metal layers 416-1, 416-2, . . . 416-n can be greatly reduced.

In some embodiments, incorporation of certain chemical elements of the root pass weld metal layer 412 into the one or more weld metal layers 416-1, 416-2, . . . 416-n may be further suppressed by inserting a buffer weld metal layer between the root pass weld metal layer 412 and the one or more weld metal layers 416-1, 416-2, . . . 416-n, as described in the following.

Figure 5A:
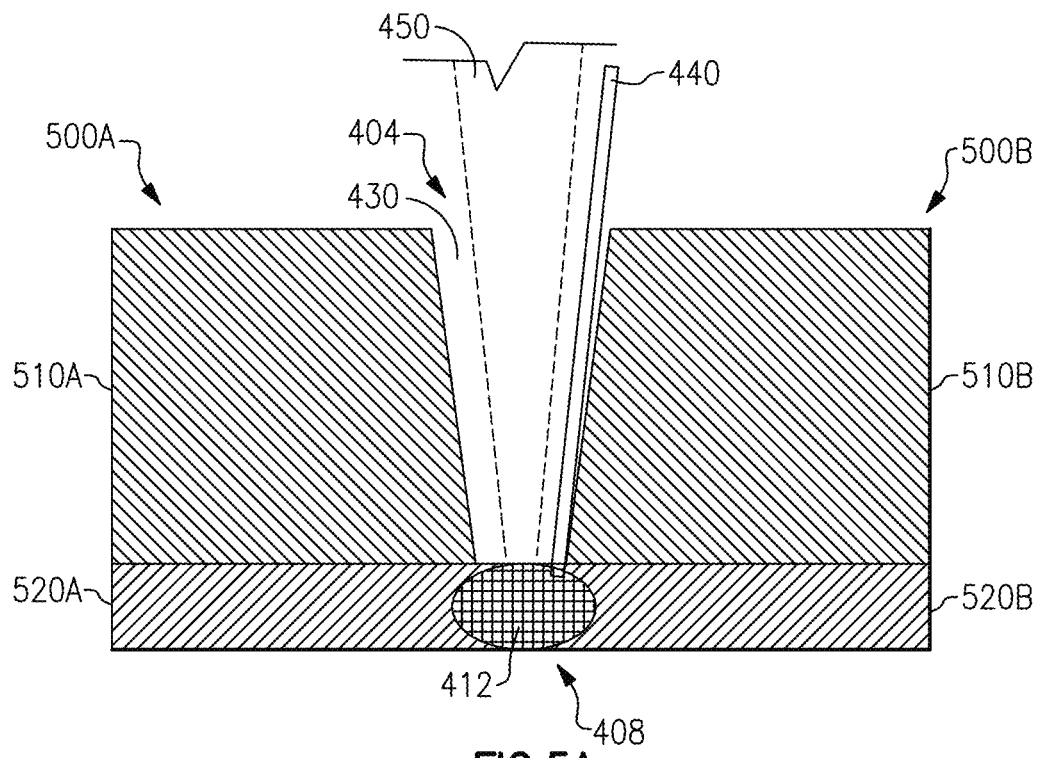
FIGS. 5A-5C illustrate cross-sectional views of intermediate structures at various stages of welding multi-layered metallic workpieces, according to embodiments.
Figure 5B:
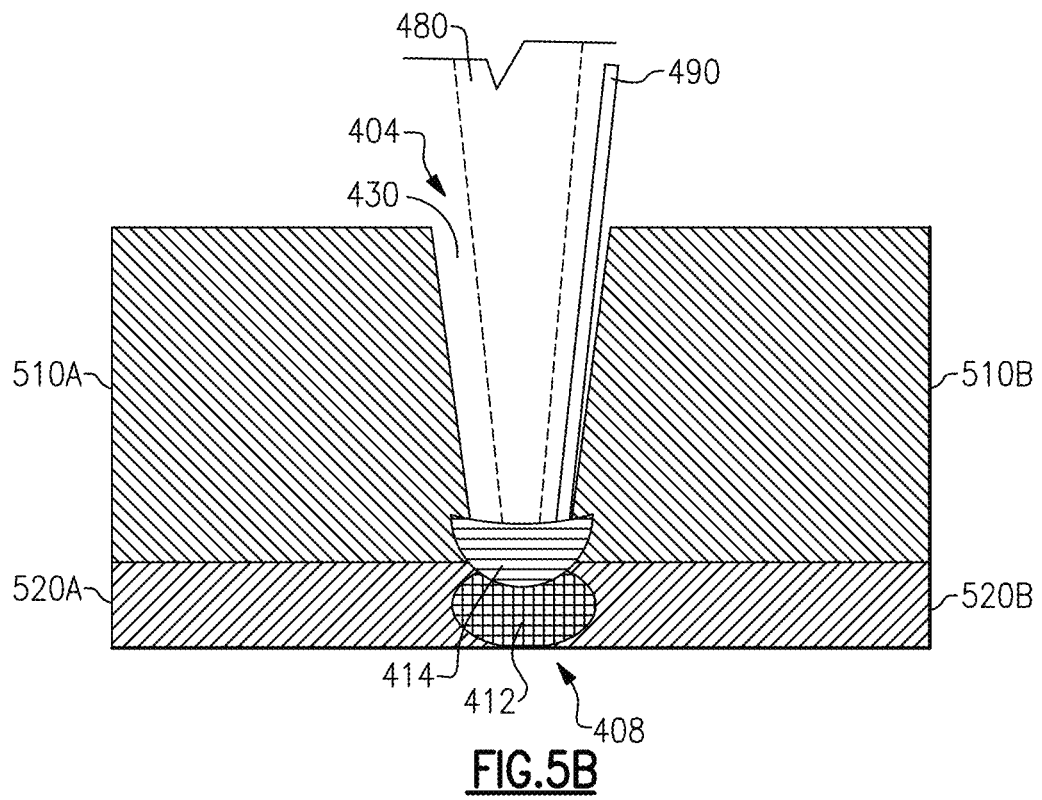
Figure 5C:
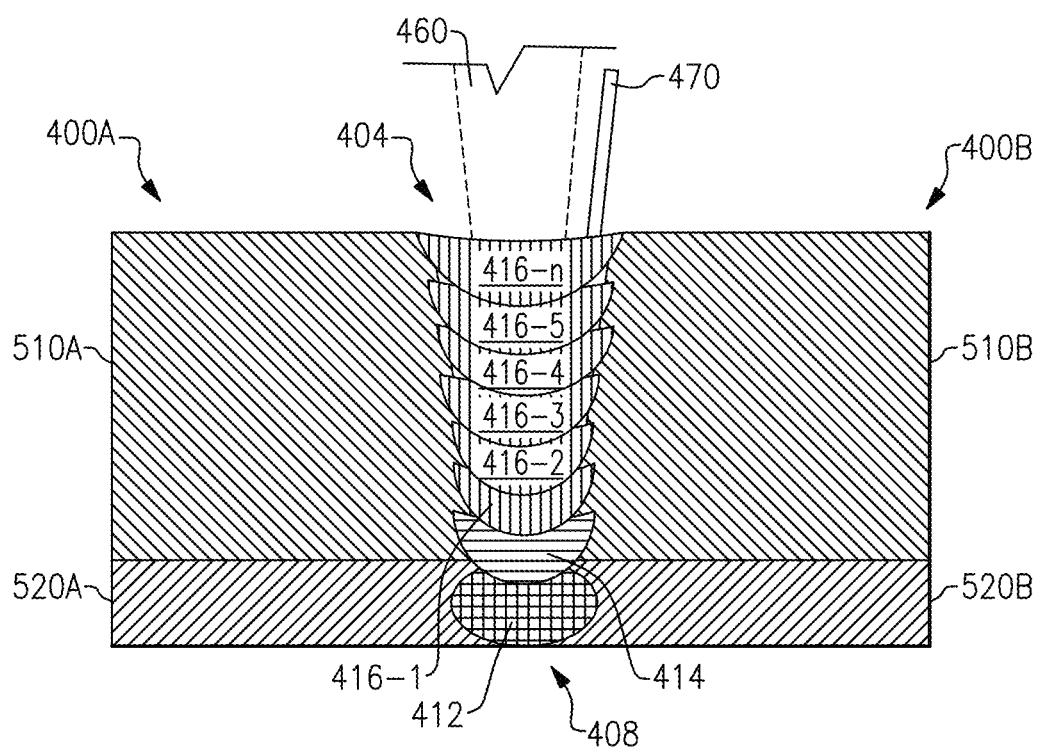

FIGS. 5A-5C illustrate cross-sectional views of intermediate structures at various stages of welding multi-layered metallic workpieces, according to some other embodiments. FIG. 5A illustrates an intermediate structure comprising a first multi-layered workpiece 500A and a second multi-layered workpiece 500B, after a groove 430 has been formed, and during or after formation of a root pass weld metal layer 412 comprising a first concentration of corrosion resistant element in the groove 430, e.g., at a bottom of the groove 430, by resistively heating or melting a first filler wire 440 and focusing a first laser beam 450 having a first intensity in the groove 430, e.g., at the bottom of the groove 430, to form a root pass weld pool, in a similar manner and using similar materials as described above with respect to FIG. 4A.

Thereafter, referring FIG. 5B, unlike the embodiment illustrated above with respect to FIGS. 4B and 4C, prior to forming one or more weld metal layers 416-1, 416-2, . . . 416-n in the groove 430, a buffer weld metal layer 414 is formed on the root pass weld metal 412. The buffer weld metal layer 414 may be formed using a third filler wire 490 different from the first and second filler wires 440, 470 described above with respect to FIGS. 4A-4C. In some embodiments, the third filler wire 490 has a composition such that the buffer weld metal layer 414 formed therefrom serves as a dilution layer, diffusion buffer or a diffusion barrier layer to suppress one or more chemical elements, e.g., a corrosion resistant element, present in the root pass weld metal layer 412 from being subsequently incorporated into one or more weld metal layers 416-1, 416-2, . . . 416-n (FIG. 5C) formed thereon. To serve this function, the third filler wire 490 according to embodiments has a substantially lower concentration, e.g., less than 50%, less than 30%, less than 10%, less than 5%, less than 2%, less than 1%, substantially 0%, or a concentration in a range defined by any of these values, of one or more of the chemical element(s) the buffer weld metal layer 414 is serving as a diffusion buffer for or a diffusion barrier layer against, relative to the first filler wire 440 used to form the root pass weld metal layer 412. Additionally or alternatively, the buffer weld metal layer 414 according to embodiments has a substantially lower concentration, e.g., less than 50%, less than 30%, less than 10%, less than 5%, less than 2%, less than 1%, substantially 0%, or a concentration in a range defined by any of these values, of one or more of the chemical element(s) the buffer weld metal layer 414 is serving as a diffusion buffer for or a diffusion barrier layer against, relative to the root pass weld metal layer 412. For example, when the buffer weld metal layer 414 serves as a diffusion buffer or a diffusion barrier against Cr in the root pass weld metal layer 412, and the first filler wire 440 or the root pass weld metal layer 412 has a Cr concentration of about 20 wt % or higher, the third filler wire 490 has a Cr concentration that is less than 10 wt %, less than 5 wt %, less than 2 wt %, less than 1 wt %, less than 0.4 wt %, less than 0.2 wt %, substantially 0 wt %, or a concentration in a range defined by any of these values.

In some embodiments, the buffer weld metal layer 414 is formed using a third filler wire 490 which includes a combination of elements including one or more of: Ni at a concentration greater than that of the second layers 420A, 420B and greater than that of the second filler wire 470 (FIGS. 4B, 4C), e.g., greater than about 55%, greater than about 60 wt %, greater than about 65 wt %, greater than about 70 wt %, greater than about 75 wt %, greater than about 80 wt %, greater than about 85 wt %, greater than about 90 wt %, greater than about 95 wt % or a concentration in a range defined by any of these values; Ti at a concentration between about 0.01 wt % and about 5.5 wt %, between about 0.5 wt % and about 5 wt %, between about 1 wt % and about 4.5 wt %, between about 1.5 wt % and about 4 wt %, between about 2 wt % and about 3.5 wt %, or a concentration in a range defined by any of these values; Al at a concentration less than 2.5 wt %, less than 2.0 wt %, less than 1.5 wt %, less than 1.0 wt % or a concentration in a range defined by any of these values; each of Fe and Mn at a concentration less than 2 wt %, less than 1.5 wt %, less than 1.0 wt %, less than 0.5 wt % or a concentration in a range defined by any of these values; and one or more of C, P, S, Si and Cu at a concentration less than 1 wt %, less than 0.8 wt %, less than 0.6 wt %, less than 0.4 wt %, less than 0.2 wt %, less than 0.1 wt %, less than 0.05 wt %, or a concentration in a range defied by any of these values.

In some embodiments, the buffer weld metal layer 414 may be formed by resistively melting the third filler wire 490 using a third resistive heating power similar to or different than the first resistive heating power used to melt the first filler wire 440 to form the root pass weld metal 412, and similar to or different than the second resistive heating power used to melt the second filler wire 440 to form subsequent one or more weld metal layers 416-1, 416-2, . . . 416-n (FIG. 5C).

In addition, the buffer weld metal layer 414 may be formed by resistively melting the third filler wire 490 while focusing a third laser beam 480 having a third intensity similar to or different than the first intensity of the first laser beam 450 used to form the root pass weld metal 412, and similar to or different than the second intensity of the second laser beam 460 used to form subsequent one or more weld metal layers 416-1, 416-2, . . . 416-n (FIG. 5C).

In some embodiments, the third laser beam 480 and the third resistive heating power for heating the third filler wire 490 may be similar to the second laser beam 460 and the second resistive heating power for heating the second filler wire 470, respectively. For example, in some embodiments, similar to the second laser beam 460, the third laser beam 490 has a third laser power density that is lower than the first laser power density of the first laser beam 450 described above, similar to the second laser beam 460, such that the amount of melting of the root pass weld metal layer 412, the first layers 510A, 510B and/or the third filler wire 490 during formation of the buffer metal layer 414 is less than the amount of melting of the second layers 520A, 520B and the first filler wire 440 by the first laser beam 450 during the formation of the root pass weld metal layer 412. Similarly, in some embodiments, the third resistive heating power for resistively heating the third welding electrode 490 is lower than the first resistive heating power for resistively heating the first welding electrode 440, such that the amount of melting of the root pass weld metal layer 412, the first layers 510A, 510B and/or the third filler wire 490 during the formation of the buffer metal layer 414 is less than the amount of melting of the second layers 520A, 520B and the first filler wire 440 by the first resistive heating power of the first welding electrode 440 during the formation of the root pass weld metal layer 412.

FIG. 5C illustrates an intermediate structure comprising a first multi-layered workpiece 400A and a second multi-layered workpiece 400B, during or after formation of one or more weld metal layers 416-1, 416-2, ... 416-n in the groove 430, on the buffer weld metal layer 414. According to embodiments, the one or more weld metal layers 416-1, 416-2, ... 416-n can be formed in a similar manner as described above with respect to FIGS. 4B and 4C by resistively melting the second filler wire 470 while focusing the second laser beam 460. However, embodiments are not so limited, and in other embodiments, the one or more weld metal layers 416-1, 416-2, ... 416-n can be formed using a different filler wire, different resistive heating power and/or different laser power. In yet some other embodiments, the one or more weld metal layers 416-1, 416-2, ... 416-n can be formed using other welding techniques, such as gas metal arc welding (GMAW).

Thus formed the one or more weld metal layers 416-1, 416-2, ... 416-n have a composition corresponding to a mixture of the second filler wire 470, the first layers 510A, 510B, and the buffer weld metal layer 414, while advantageously controlling or limiting incorporation of chemical elements from the root pass weld metal layer 412 there into, such that the one or more weld metal layers 416-1, 416-2, ... 416-n incorporate certain chemical elements of the root pass weld metal layer 412 described above, e.g., corrosion resistant elements, at a concentration less than 50 wt %, less than 40 wt %, less than 30 wt %, less than 20 wt %, less than 10 wt %, less than 5 wt %, less than 1 wt %, or a concentration in a range defined by any of these values relative to the concentrations of the certain chemical elements in the root pass weld metal layer 412.

It will be appreciated that according to various embodiments described herein, one or more of the root pass weld metal layer 412, the buffer weld metal layer 414 and the one or more weld metal layers 416-1, 416-2, ... 416-n can be formed using a laser in conjunction with resistive heating as described above, while the others of the root pass weld metal layer 412, the buffer weld metal layer 414 and the one or more weld metal layers 416-1, 416-2, ... 416-n are formed using other processes. For example, the buffer weld metal layer 414 may be formed by resistively heating a buffer filler wire while directing a laser beam over the root pass weld metal layer, while the root pass weld metal layer 412 and the one or more weld metal layers 416-1, 416-2, ... 416-n are formed using other processes. In some embodiments, the other processes may or may not employ a laser and/or resistive heating and may or may not employ a plasma arc. Examples of the other processes can include, e.g., gas metal-arc welding (GMAW), flux-cored arc welding (FCAW), plasma arc welding (PAW), hybrid laser arc welding (HLAW), shielded metal arc welding (SMAW) and submerged arc welding (SAW), to name a few.

Figure 6:
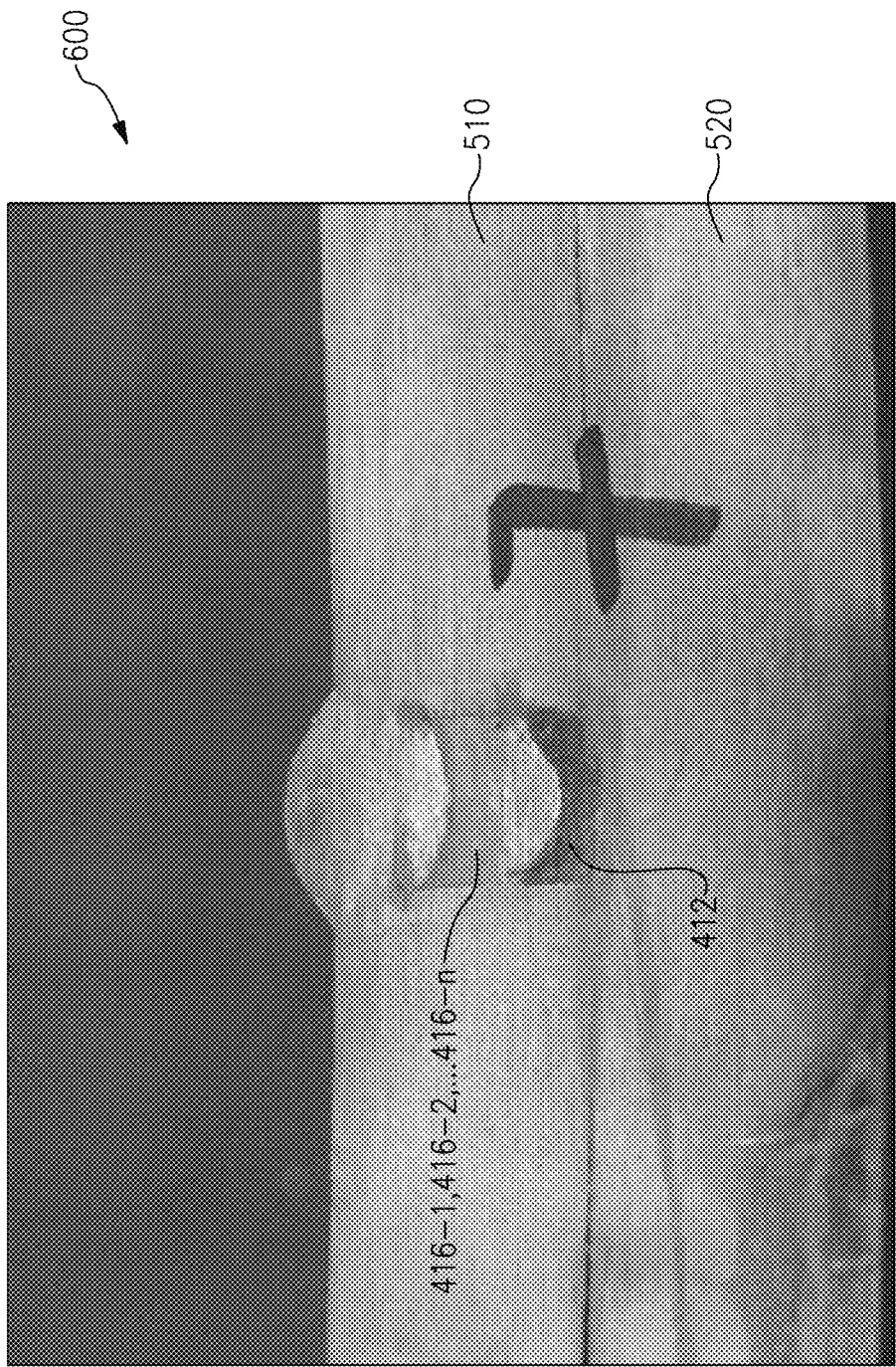
FIG. 6 illustrates a cross-sectional microscope image of an experimental weld joint formed according to a method similar to that described above with respect to FIGS. 4A-4C.

FIG. 6 illustrates a cross-sectional microscope image 600 of an experimental weld joint formed according to one method similar to that described above with respect to FIGS. 4A-4C, except, for illustrative purposes, in the illustrated workpiece, a groove has been formed in the first layer 510 on a relatively thick second layer 520. The cross-sectional image 600 illustrates a weld joint in which a root pass weld metal layer 412 is formed at the bottom of the groove, followed by a plurality of weld metal layers 416-1, 416-2, ... 416-n.

While certain embodiments have been described herein, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. A method of welding multi-layered metallic workpieces, the method comprising:
   providing a pair of multi-layered workpieces, each having a base layer formed over a cladding layer comprising a corrosion resistant element;
   forming a root pass weld bead to join the cladding layers of the workpieces using a first filler wire comprising the corrosion resistant element;
   forming one or more weld beads over the root pass weld bead to join the base layers of the workpieces by resistively heating a second filler wire while directing a laser beam over the root pass weld bead, such that a concentration of the corrosion resistant element in at least one of the one or more weld beads is less than 50% of a concentration of the corrosion-resistant element in the root pass weld bead; and
   forming a buffer weld bead between the root pass weld bead and the one or more weld beads, wherein the buffer weld bead is formed by resistively heating a buffer filler wire while directing another laser beam over the root pass weld bead, wherein the buffer filler wire has a different composition than the first filler wire and the second filler wire.

2. The method of claim 1, wherein the corrosion resistant element comprises chromium.

3. The method of claim 2, wherein the one or more weld beads comprise iron or a ferrous alloy.

4. The method of claim 3, wherein the multi-layered workpieces are cladded pipes having an inner layer surrounded by an outer layer, wherein the inner layer is the cladding layer comprising the corrosion resistant layer, and wherein the outer layer is a base pipe wall comprising the base layer.

5. The method of claim 1, wherein forming the root pass weld bead comprises resistively heating the first filler wire while directing a first laser beam over the cladding layers.

6. The method of claim 5, wherein the laser beam directed over the root pass weld bead has a lower intensity relative to the first laser beam directed at the cladding layers.

7. The method of claim 5, wherein the second filler wire is resistively heated at a lower power relative to the first filler wire.

8. The method of claim 1, wherein the root pass weld bead penetrates an entire thicknesses of the cladding layer of each of the multi-layered workpieces.

9. The method of claim 1, wherein the buffer filler wire comprises nickel at a concentration greater than 90 wt %.

10. A method of forming a weld joint, comprising:
providing a pair of multi-layered workpieces each having a base layer and a cladding layer, the cladding layer comprising a corrosion resistant element and the base layer comprising a ferrous alloy;
forming a root pass weld bead to join the cladding layers of the workpieces from a first weld pool using a first filler wire comprising the corrosion resistant element;
forming a buffer weld bead by resistively heating a buffer filler wire while directing a laser beam over the root pass weld bead; and
forming one or more weld beads on the buffer weld bead to join the base layers of the workpieces using a second filler wire comprising a ferrous alloy,
wherein the buffer filler wire has a different composition than the first filler wire and the second filler wire.

11. The method of claim 10, wherein the buffer filler wire comprises nickel at a concentration greater than 90 wt %.

12. The method of claim 11, wherein the second filler wire comprises a steel composition, and the first filler wire comprises a chromium concentration greater than 10 wt %.

13. The method of claim 12, wherein a concentration of the corrosion-resistant element in the one or more weld beads is less than 50% of a concentration of the corrosion-resistant element in the root pass weld bead.

14. The method of claim 10, wherein forming the root pass weld bead comprises forming the first weld pool such that the first weld pool penetrates an entire thicknesses of the cladding layers.

15. The method of claim 14, wherein forming the one or more weld beads comprises forming a second weld pool that does not penetrate an entire thickness of the root pass weld bead.

16. The method of claim 10, wherein the step of forming the one or more weld beads on the buffer weld bead includes resistively heating the second filler wire while directing another laser beam within a weld joint, such that a concentration of the corrosion resistant element in at least one of the one or more weld beads is less than 50% of a concentration of the corrosion-resistant element in the root pass weld bead.

* * * * *